United States Patent [19]

Cuche et al.

[11] Patent Number: 4,481,793
[45] Date of Patent: Nov. 13, 1984

[54] KNITTING MACHINE

[75] Inventors: Claude Cuche, Corcelles; Fritz Kohler, Couvet, both of Switzerland

[73] Assignee: Edouard Dubied & Cie. (Societe Anonyme), Switzerland

[21] Appl. No.: 414,516

[22] Filed: Sep. 2, 1982

[30] Foreign Application Priority Data

Jul. 19, 1982 [CH] Switzerland .......................... 4389/82
Sep. 8, 1981 [CH] Switzerland .......................... 5774/81

[51] Int. Cl.³ .......................... D04B 7/00; D04B 15/66
[52] U.S. Cl. .................................................... 66/75.2
[58] Field of Search ........................................ 66/75.2

[56] References Cited

U.S. PATENT DOCUMENTS

| | | | |
|---|---|---|---|
| 3,715,897 | 2/1973 | Hadam | 66/75.2 |
| 3,717,014 | 2/1973 | Kohler | 66/75.2 |
| 3,892,108 | 7/1975 | Hadam | 66/75.2 |
| 3,913,354 | 10/1975 | Kohler et al. | 66/75.2 |
| 3,974,664 | 8/1976 | Erb | 66/75.2 |
| 4,196,599 | 4/1980 | Guell | 66/75.2 |
| 4,197,722 | 4/1980 | Cote-Petit et al. | 66/75.2 |
| 4,214,460 | 7/1980 | Shima | 66/75.2 |

*Primary Examiner*—Ronald Feldbaum
*Attorney, Agent, or Firm*—Lewis H. Eslinger

[57] ABSTRACT

A knitting machine includes a needle bed having a groove formed therein, a needle housed in the groove and reciprocatingly slidable therein, a needle cam, a needle cam follower mounted on the needle and engageable with the needle cam, a needle stitch selector and a needle cam disengager responsive to the stitch selector for controllably disengaging the needle cam follower from the needle cam. The stitch selector includes an electromagnetic selection station and at least one selector member which is slidably mounted on the needle bed. The selector member is responsive to the selection station and positioned thereby in one of at least two distinct positions in respect to the needle bed. The needle cam disengager includes a two-arm lever which is pivotally mounted on the bed. The first arm of the lever cooperates with the selector member and its second arm is in communication with the needle cam follower via the needle and acts operatively thereon to disengage the needle cam follower from the needle cam. The needle cam disengager also includes a tuck selector, a tuck selector first cam, and a tuck selector cam follower mounted on the tuck selector which engages the tuck selector first cam when the lever is in a selected position. The needle cam disengager further includes a tuck selector second cam positioned to engage the tuck selector and which, upon engagement with the tuck selector, causes the second arm of the lever via the tuck selector to disengage the needle cam follower.

17 Claims, 13 Drawing Figures

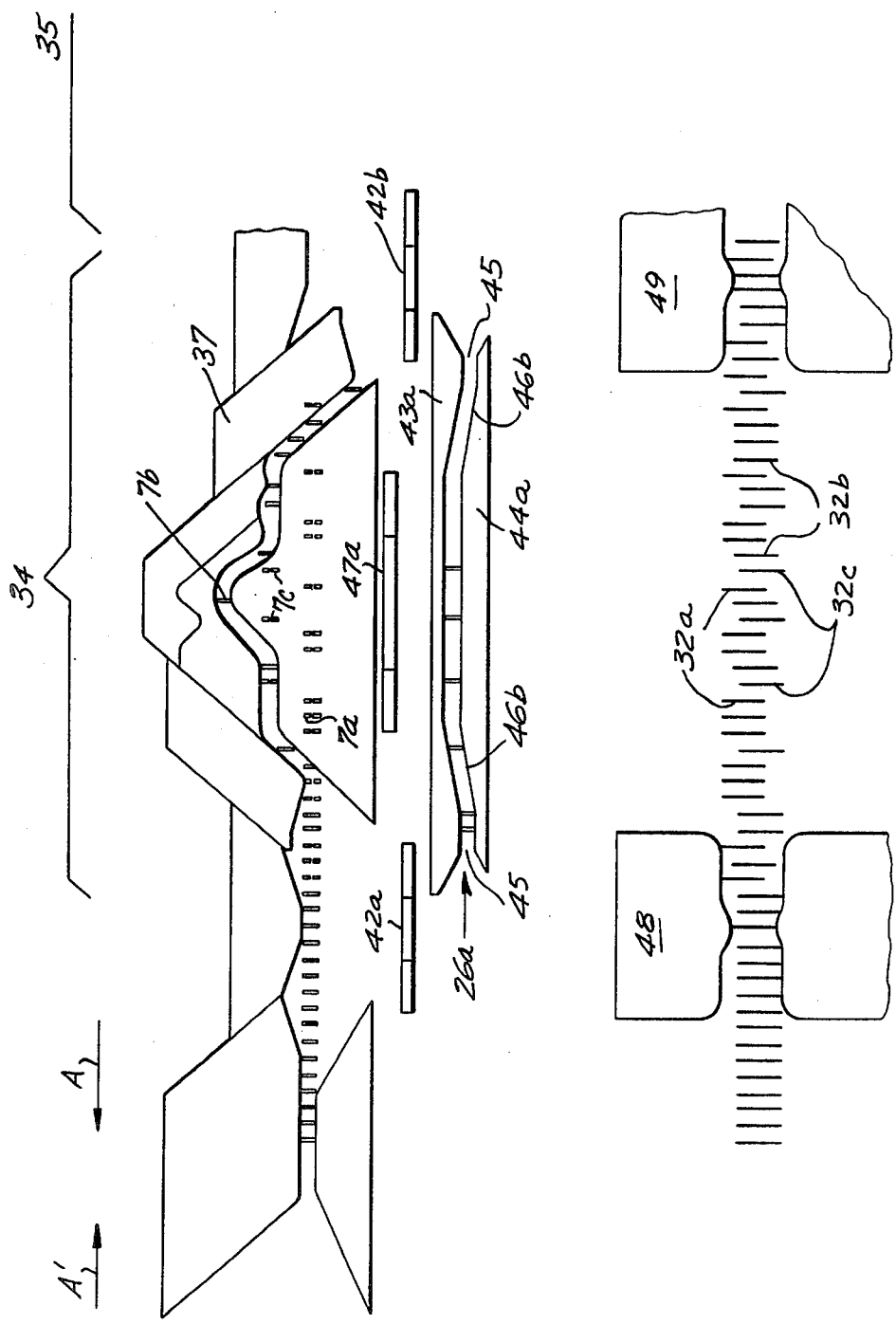

KNITTING MACHINE

BACKGROUND OF THE INVENTION

Field of the Invention

The present invention relates to a new and useful knitting machine which uses an electromagnetic needle selection.

Knitting machines or devices of the type having electromagnetic needle selection are already known as part of the state of the art.

Swiss Pat. No. 618,484 describes a knitting machine in which the needles are extended by two superimposed arms (stems), one of which, flexible and fitted with a butt, can be imbedded and held so imbedded by means of an electromagnetic selection for the purpose of placing the needle in out-of-action position in the row in progress, or imbedded temporarily by placing into action one or several pressing devices on one or several of the tracks formed by the alignment of the butts of manually preselected tuck selectors for the purpose of stitch tucking. Even if this solution is fully satisfactory from the viewpoints of design and use, it must be noted that so-called "three-track" knitting, i.e. formation, tucking and out-of-action in one and the same row and one and the same knitting system is limited, for each item, to combinations resulting from the manual distribution of the butts of the tuck selector in either of said tracks.

To increase combination possibilities by using the same system would be tantamount to increasing the number of tracks. Such a modification would result in drawbacks such as the broadening of the cam-holder, the lengthening of the needles and of the needle grooves, an increased number of vertical cams, an increased number of control members for the vertical cams, and a programming complexity making it unsuitable for consideration.

To obtain a possibility of full "three-track" selection with this system, i.e. to select each needle independently of each other in each knitting system and in each row, would make it necessary for the builder to provide one track per needle housed in the bed for each knitting system. Hence, it is physically impossible to extend the system.

German Pat. No. 19 62 787 describes a knitting machine in which the plates are integral with the needles via a ball and socket joint. Several plate-pressing blocks are housed in the same groove as the needle. They make it possible to imbed the needle butts in some spots, so that the butts may be positioned out of reach of the cam boxes.

The plurality of plate-pressing blocks and the wrought shape of the bed constitute major drawbacks with regard to overall dimensions and manufacture. Full "three-track" knitting is not possible without the use of two selection stations, one downstream the knitting system, the other downstream the maximum ascension ramp of a needle viewed in the direction of movement of the selection members with respect to the knitting system; the system's design would be too complicated.

German patent application No. 21 55 251 describes a selection device for the knitting needle selectors making it possible for the needles to be controlled in action position, tuck position and out-of-action position. The selectors may be located in three distinct positions. Two end positions are obtained via electromagnetic selection and deflection of the selectors. A third, intermediary position is obtained by defiling, without deflection, the selector in the selection station. Stabilization of the selector is obtained by means of magnets located below the selection members. The selectors defiling in this third position are held mechanically in this position by means of a stationary channel.

The design of the device, i.e. deflection ramps followed by separate channels representing the three tracks, results in a device that can operate in only one direction and, therefore, is intended for circular knitting machines, for example. A symmetrical embodiment is not possible. An application to linear knitting machines would require two devices arranged so as to operate one in a direction of movement of the knitting carriage, the other working in the opposite direction. Consequently, this solution leads to over-dimensioning of the cam holders.

Swiss Pat. No. 622,566 describes an electromagnetic needle selection device of a knitting machine. A pair of electromagnets acting in opposition to one another form a channel in which selection members defile. The device is symmetrical with respect to the defilement pin of the selection members and symmetrical with respect to the plane of the pair of electromagnets passing through the selection poles. This device is designed to be operational in both directions of movement of a knitting carriage on a linear machine. It defines two distinct positions of the selection members depending on whether one or the other electromagnet is energized. This solution is very satisfactory and fulfills its task even at the high knitting speeds which knitters customarily use.

The drawback of this system, when applied to make selections in accordance with the "three-track" method, is the uncertainty of the position of the selection member in the event that none of the electromagnets is energized.

OBJECTS AND SUMMARY OF THE INVENTION

An object of the present invention is to provide a simple knitting machine, with reciprocating motion of the carriages or needle beds, which combines the selection advantages of a conventional knitting machine with those of random electromagnetic selection.

A further object of this invention is to provide an improved knitting machine which permits full "three-track" knitting.

Another object of this invention is to provide an improved knitting machine which significantly increases the knitting possibilities while decreasing the number of selection members.

It is a still further object of this invention to provide an improved knitting machine which uses a single electromagnetic selection station downstream a knitting system which by the selectors define the three most desired needle positions—knitting, tuck and out-of-action.

In accordance with one aspect of the present invention, a knitting machine comprises a needle bed having a groove formed therein, a needle housed in the groove and reciprocatingly slidable therein, needle cam means, needle cam follower means mounted on the needle and selectively engagable with the needle cam means so that when the two are engaged relative movement between the needle cam means and the needle cam follower means causes the needle to move relative to the needle bed, control means for selecting a needle stitch and needle cam disengaging means responsive to the stitch selecting control means for controllably disengaging the needle cam follower means from the needle cam means. The stitch selecting control means includes an electromagnetic selection station and at least one selector member which is slidably mounted on the needle bed and which is responsive to the selection station so as to be positioned in one of at least two distinct positions in respect to the needle bed. The needle cam disengaging means includes a two-arm lever which is pivotally mounted on the bed. The first arm of the lever cooperates with the selector member and its second arm, which is opposite the first, is in communication with the needle cam follower means via the needle and acts operatively thereon to disengage the needle cam follower means from the needle cam means. The two-arm lever is responsive to the selector member so as to occupy distinct positions about its pivotal axis which correspond to distinct positions of the selector member. The needle cam disengaging means also includes a tuck selector which is slidably mounted on the two-arm lever, tuck selector first cam means, and tuck selector cam follower means mounted on the tuck selector which engages the tuck selector first cam means when the lever is in a selected position, so that relative movement between the tuck selector first cam means and the tuck selector cam follower means, when the latter is engaged with the former, causes the tuck selector to move from a first position to a second position in respect to the lever. The needle cam disengaging means further includes tuck selector second cam means positioned to engage the tuck selector when the tuck selector is in the second position, and which, upon engagement with the tuck selector, causes the second arm of the lever via the tuck selector to disengage the needle cam follower means.

In accordance with one preferred embodiment of the present invention the knitting machine is distinguishable by the fact that two juxtaposed selector members, each being displaceable into two distinct positions by means of the electromagnetic selection stations, are assigned to each of the two-arm levers.

In accordance with another preferred embodiment of the invention, the knitting machine comprises selector members which are displaceable into three positions, an electromagnetic selection station with three-positions working together with the selector members, and safety and stabilization means for the selection at the selection station level.

Other objects and advantages reside in the details of construction and operation as more fully hereinafter described and claimed, reference being had to the accompanying drawings forming part hereof, wherein like numerals refer to like parts throughout.

BRIEF DESCRIPTION OF THE DRAWINGS

The attached drawings show, by way of example, two embodiments of the knitting machine forming the subject of the invention.

FIG. 9 is a fractional portion of FIG. 2, on a larger scale, showing various selections according to the second embodiment of FIG. 8;

DETAILED DESCRIPTION OF THE PREFERRED EMBODIMENTS

Figure 1:
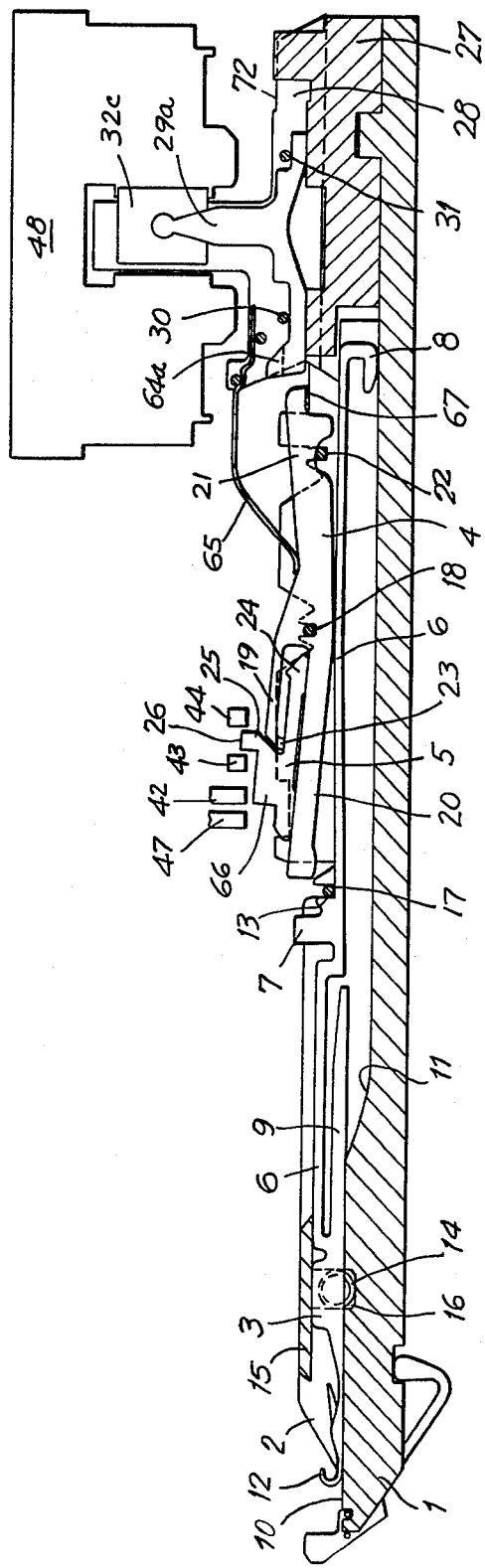
FIG. 1 is a cutaway view of a needle bed in accordance with a first embodiment, showing a "tuck" selection.

Reference is now made to the drawings in detail and initially to FIG. 1, which shows one of the needle beds of a linear knitting machine which generally comprises two needle beds arranged in pairs, in the form of a roof. Needle bed 1 comprises a plurality of grooves or tricks 2 parallel to each other. In each trick there are housed a needle 3, a two-arm lever 4 and a tuck selector 5. Needle 3 is composed of two stems, an upper stem 6 fitted with a needle butt 7, which acts as a cam follower, and a gliding foot 8, and a lower stem 9 forming the base of the needle. Trick 2 has been made deeper toward the rear, on the right side in FIG. 1, and thus forms two slide faces 10, 11 on which lower stem 9 and gliding foot 8 slide. Needle 3, furthermore, comprises a needle hook 12 and a retaining lug 13. Lower stem 9, used to ensure positive support of the needle in the maximum advance position of needle 3, which is the stitch transfer position, may be used as a braking member of the needle in its trick. For each displacement of needle 3, stem 9 moves among the turns of a brake spring 14 housed under a needle cover strip 15 and in a groove 16 cut into needle bed 1 perpendicularly to tricks 2.

Permanent out-of-action position of the needle is obtained manually by imbedding needle butt 7 in trick 2; retaining lug 13, passing under a wire 17, will hold the needle in this position for as long as a manual displacement has not been made.

Two-arm lever 4, which acts as a needle cam disengaging device, is mounted so as to pivot about a pin 18, integral with needle bed 1. One arm of lever 4 includes an upper portion 19 and a lower portion 20, the two portions forming a fork between each other in which tuck selector 5 is guided. Lower portion 20 rests against upper stem 6 of needle 3, between retaining lug 13 and gliding foot 8. The other arm or feeler 21 of two-arm lever 4 is diametrically opposite the forked arm with respect to pivot pin 18. A limiting wire 22, integral with needle bed 1, delimits one end position of said two-arm lever. Tuck selector 5 can slide longitudinally over a distance delimited by nose 23 acting either on notch 24, or on the shoulder of butt 25 of tuck selector 5. Butt 25 acts as a cam follower and, if positioned to do so, will follow cam tracks 26 in the manner described below.

An auxiliary bed 27 is mounted on needle bed 1, in the extension of tricks 2. It comprises a plurality of tricks 28 whose number is double that of tricks 2 of needle bed 1. Selector members include upper and lower selectors. Lower selectors 29a and 29b, placed alternately in juxtaposition and held vertically by retaining wires 30, 31, integral with the auxiliary bed, slide in tricks 28. An upper selector 32 is mounted on each lower selector 29a and 29b (shown in FIG. 6), respectively.

Figure 2:
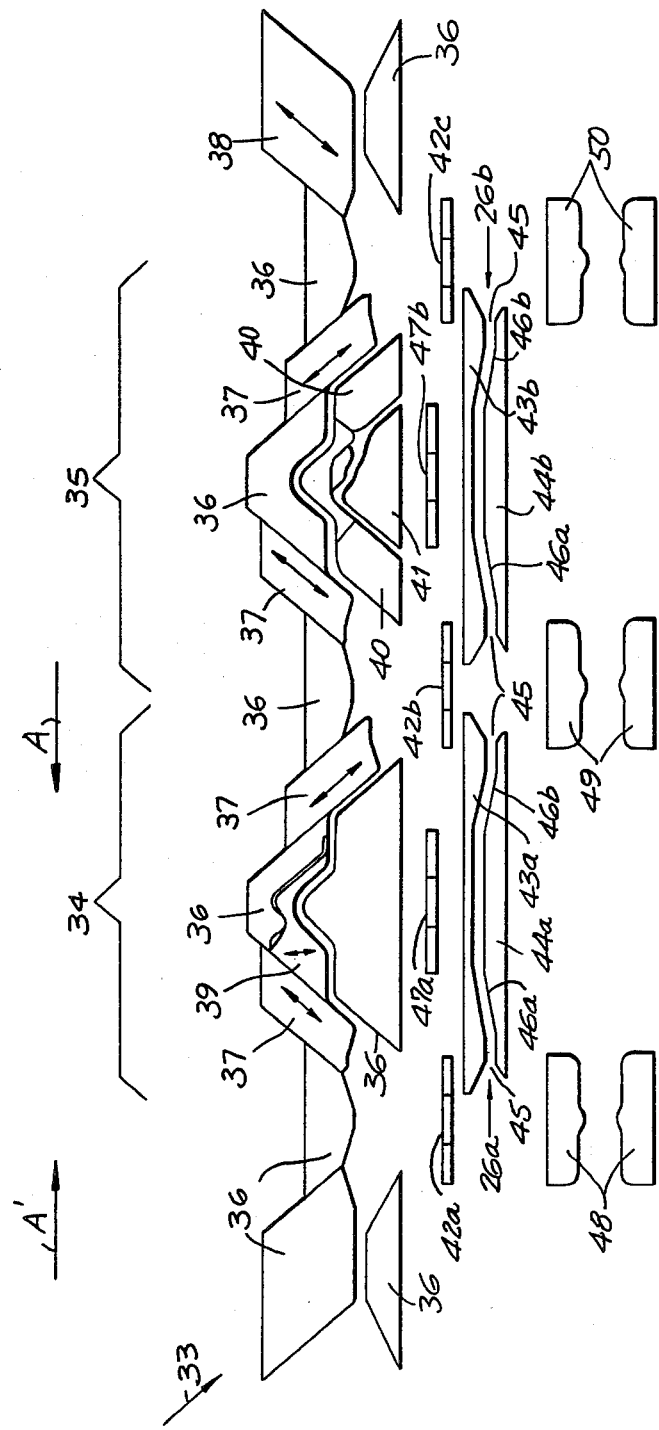
FIG. 2 is a schematic representation of a knitting cam box, comprising vertical cams and selection stations also integral with a knitting carriage.

A cam box 33 shown in FIG. 2 is assigned to each needle bed 1. It consists of a first knitting system 34 and of a second knitting system 35. Each cam box 33 is fitted with fixed cams 36. Stitch cams 37, as well as alignment cam 38 and stitch transfer cam 39, are movable in a plane parallel to the cam box. Only lifting cams 40 and stitch transfer cams 41 are movable in a plane perpendicular to the cam box. They may be selectively placed into either remote or close position with respect to their needle bed. Said positions are modified only for stitch transfer work. Two fixed vertical cams 42 (FIG. 1) are assigned to each knitting system. These are fixed vertical cams 42a and 42b for knitting system 34, and fixed vertical cams 42b and 42c for knitting system 35, fixed vertical cam 42b being intended to work together with both knitting systems. One cam track 26a, 26b (FIG. 2) is assigned to each knitting system. This track is formed from tuck selector first cam means, which comprises upper cams 43a and 43b and lower cams 44a and 44b. Each cam track 26 comprises funnel-shaped entries 45 at its entry and exit points, an ascending portion 46a and a descending portion 46b, viewed in the direction of movement of the cam boxes.

Furthermore, tuck selector second cam means, which is preferably a fixed vertical cam 47 (FIG. 1), is assigned to each knitting system. Vertical cam 47a is assigned to knitting system 34, and vertical cam 47b is assigned to knitting system 35. Cams 42a, 42b, 42c are located on one and the same cam track, and cams 47a and 47b are located on another track parallel to the first one. Viewed from the direction of travel of the cam boxes, each knitting system is directly preceded by a selection station as shown in FIG. 2. When the cam boxes move in the direction indicated by arrow A, selection station 48 precedes knitting system 34, while selection station 49 precedes knitting system 35. Whenever there is movement in opposite direction, selection station 50 precedes knitting system 35, while selection station 49 precedes knitting system 34. Selection station 49 is intended to work together with the two knitting systems 34, 35, depending on the direction of travel of the cam boxes.

Figure 3:
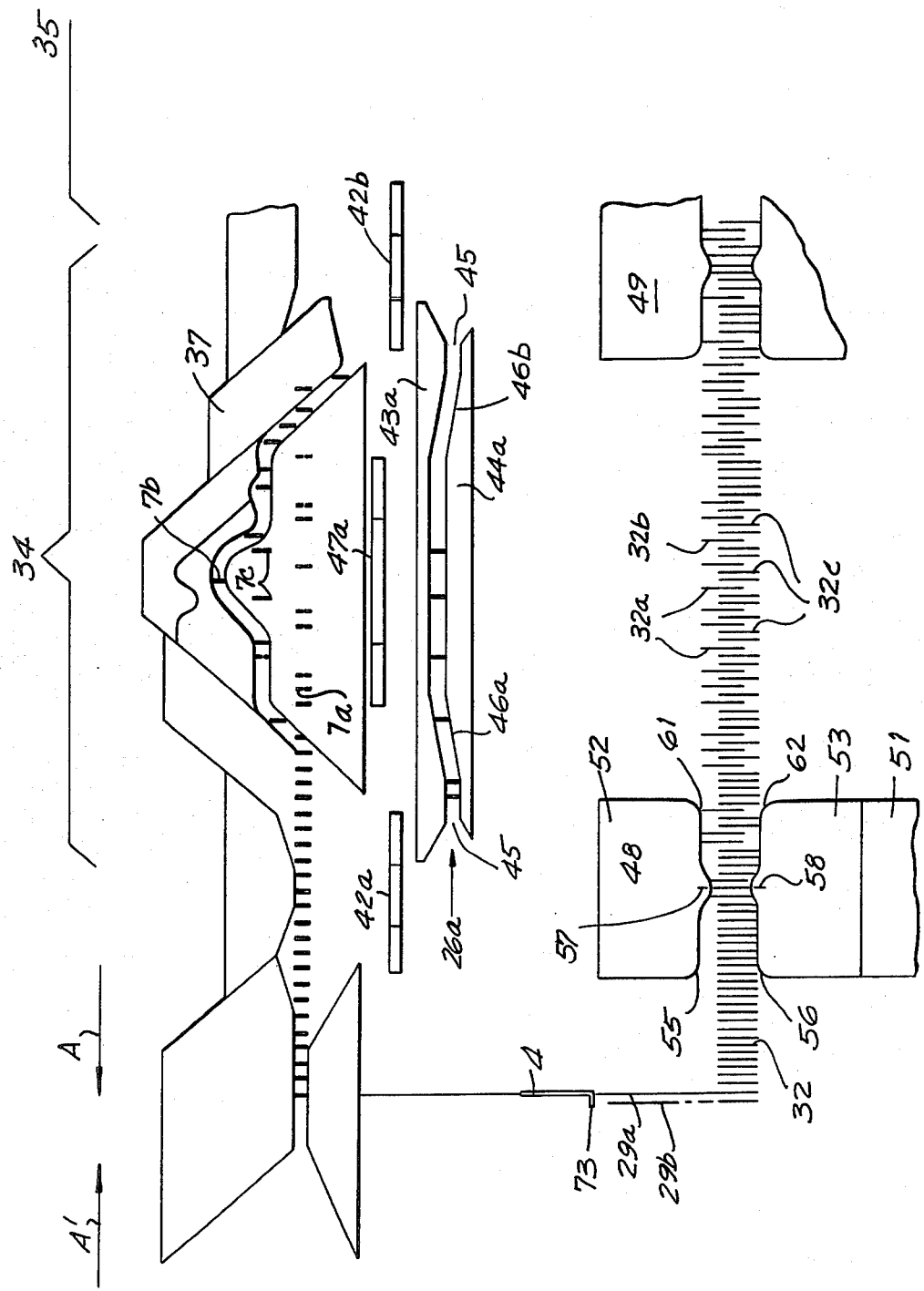
FIG. 3 is a fractional portion of FIG. 2, on a larger scale, showing various selections.

A selection station 48, 49, 50, as shown in FIG. 3, consists of a base plate 51 on which two identical selection half-stations 52, 53 are mounted to form the selection channel in which selectors 32 defile. This device is designed to operate in either direction. Within the scope of this example, we consider selectors 32 as moving, relatively with respect to the device, in the direction indicated by arrow A′. The selection channel comprises an entry point which becomes progressively narrower and is limited by flanks 55, 56, and by a selection point defined as being the channel's narrowest place, located between poles 57, 58, of the electromagnets (not shown), and an exit point which becomes progressively wider and is limited by the selection point and by flanks 61, 62.

In order to be able to freely select each needle either in stitching-in-action position, or in out-of-action position, or in tuck position, there is effected here a selection with two distinct positions of selectors 32, two of which are assigned to each needle. The two positions are obtained when either of the electromagnets is energized and pulls the selector located in the channel's narrowest place against its pole 57, 58, respectively.

This selector thereupon follows flank 61, 62, respectively, and is pulled through magnetic adherence out of the station's longitudinal plane of symmetry.

Figure 4:
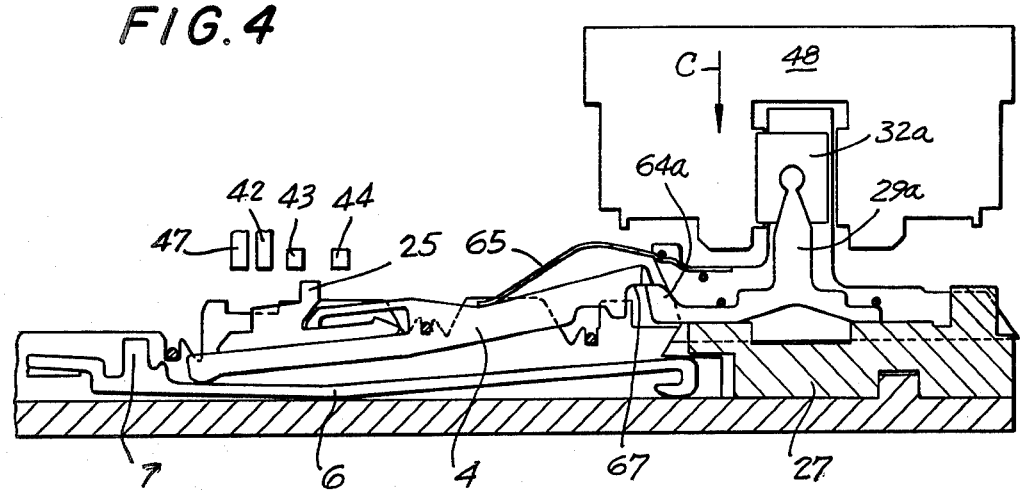
FIG. 4 is a partial cutaway similar to FIG. 1, showing an "out-of-action" selection.
Figure 6:
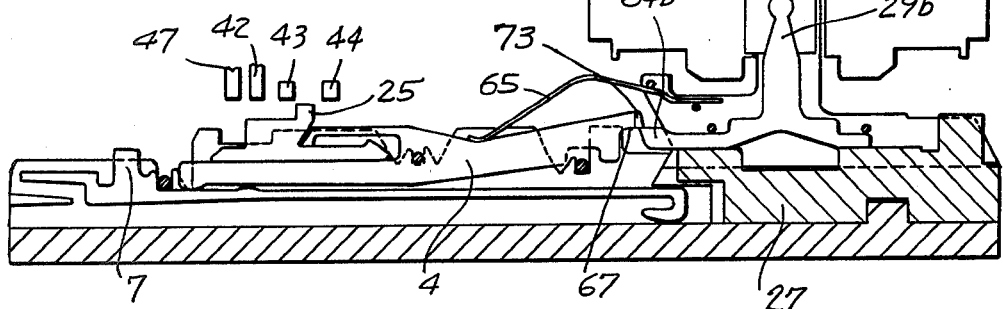
FIG. 6 is a partial cutaway similar to FIG. 1, showing a "knitting" selection.

Upper selectors 32a and 32b are mounted on lower selector 29a and 29b respectively, as shown in FIGS. 4 and 6. On account of this, the lower selectors must follow the upper selector's movements and thus slide in either of the distinct positions described above. The left end of lower selector 29a comprises a contact face 64a located at the upper level as from the bottom of groove 28.

Figure 5:
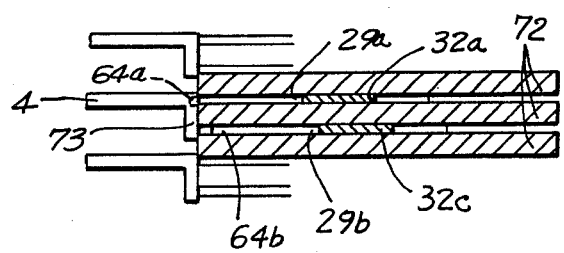
FIG. 5 is a plan view in the direction of arrow C in FIG. 4.
Figure 7:
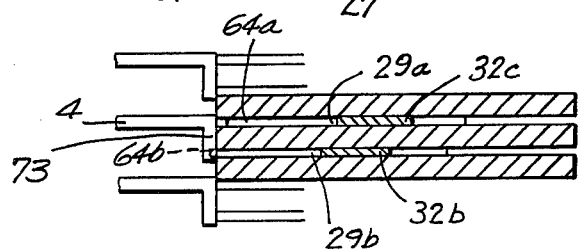
FIG. 7 is a plan view in the direction of arrow D in FIG. 6.

Lower selector 29b can be found juxtaposed and separated by a non-magnetic trick wall 72. Its left end comprises a contact face 64b located at the lower level as from the bottom of groove 28. The two lower selectors 29a and 29b may act on the same two-arm lever 4 due to a broadened end 73 of nose 67 (FIGS. 5 and 7) located opposite the left ends of the lower selectors.

We are describing the principle of "three-track" needle selection in connection with the drawings. As the cam boxes move in the direction indicated by arrow A, selectors 32 are placed in the "in-action" position. They have been placed in this position by the selector station 48 upon the cam boxes' preceding passage in opposite direction. Fixed vertical cam 42a presses against a spring effect of spring 65 and of upper stem 6 of needle 3 on all lower butts 66. On account of this, each two-arm lever 4 swings about its pin 18, and nose 67 of said two-arm lever 4 is located above the left end of lower selector 29a, 29b, respectively. Selection station 48 moves upper selectors 32 into the two distinct positions; upper selectors 32a together with lower selectors 29a are in the "out-of-action" position (FIG. 4), upper selectors 32b together with lower selectors 29b are in the "in-action" position, and upper selectors 32c together with lower selectors 29a or 29b are in the "tuck" position. Once the selection has been made, fixed vertical cam 42a is passed beyond. Under the action of spring 65 and of upper stem 6, two-arm levers 4 tend to return to their position according to FIG. 1.

Lower selectors 29a, whose upper selectors 32 are selected in 32a, shall have their left ends in advanced position so that noses 67 shall rest against contact faces 64a, thus preventing their two-arm levers 4 from returning. Needle butts 7 of corresponding needles 3 shall remain imbedded in needle bed 1 and shall thus be in position 7a of FIG. 3. Lower selectors 29b, whose upper selectors 32 are selected in 32b, shall have their left ends in advanced position so that noses 67 shall rest against contact faces 64b (FIG. 6). Thus, their two-arm rockers 4 return to a middle position in which they no longer press against upper stems 6 so that respective needle butts 7 emerge from needle bed 1, at which time they shall be taken over by the needle cams of knitting system 34. (See position 7b in FIG. 3). Corresponding needles 3 shall form stitches.

Lower selectors 29a (or 29b), whose upper selectors 32 are selected in 32c, shall have their ends moved back so as to be out of reach of noses 67 (FIG. 4). Thus their two-arm levers 4 return to the position shown in FIG. 1, this resulting from the pressure exerted by spring 65. These two-arm levers 4 no longer press against their needles which are, on account of this, taken over by the knitting device. Butts 25 of corresponding tuck selectors 5 follow cam track 26a (FIG. 3). They undergo an ascension in ascending portion 46a such that their lower butts 66 will be pushed in the action path of fixed vertical cam 47a. According to the same principle as the one underlying vertical cam 42a, it presses against lower butts 66. Needle butt 7 of the corresponding needle is momentarily imbedded and assumes position 7c of FIG. 3.

Once it has been released by vertical cam 47a, descending portion 46b places tuck selector 5 back into its position shown in FIG. 1 and needle butt 7 re-enters the cam track and is brought down by stitch cam 37. The needles thus selected will perform a yarn tucking operation. The same process takes place in connection with the next knitting system, in this case, knitting system 35, by means of fixed vertical cam 42b of selection station 49 and of fixed vertical cam 47b.

FIGS. 8 to 11 shown another embodiment of the knitting machine forming the subject of the invention, this embodiment differing from the one shown in FIGS. 1 to 7 and previously described essentially on account of the electromagnetic selection stations and of the sliding members together with which the selection stations work.

Figures 8A, 8B, 8C:
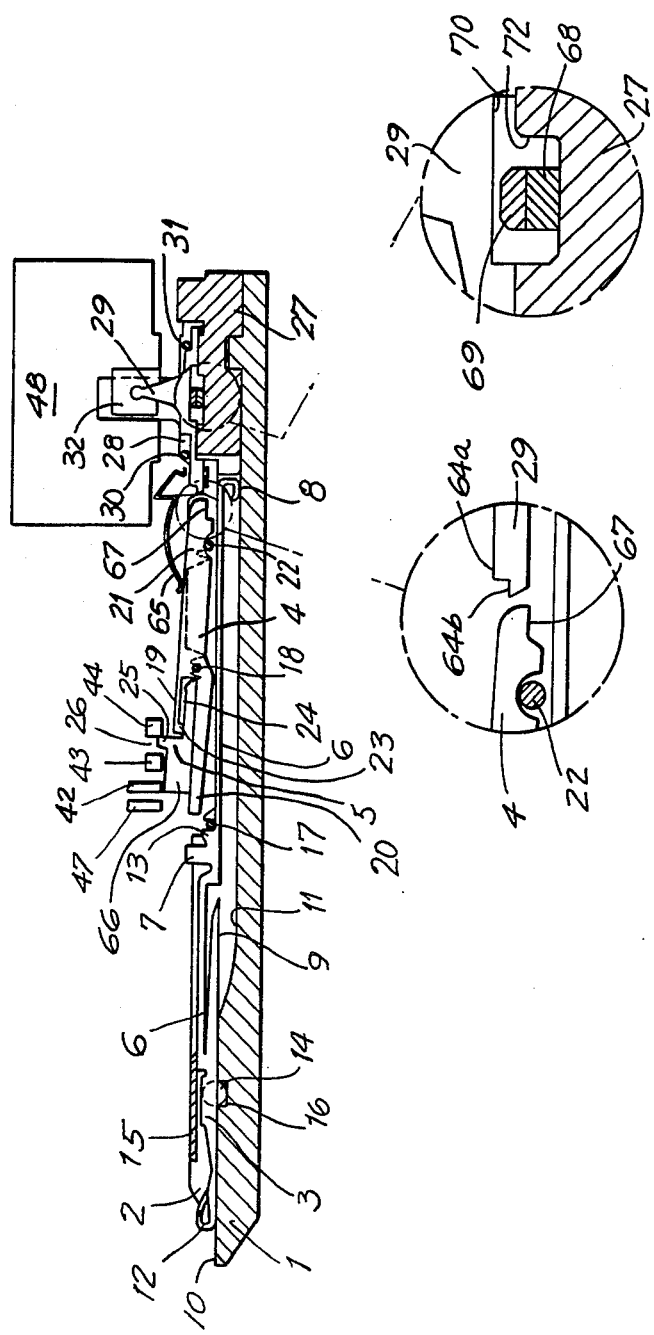
FIG. 8A is a cutaway view of a needle bed in accordance with a second embodiment.
FIGS. 8B and 8C are enlarged detailed views of portions of the embodiment of FIG. 8A.

FIG. 8A, which is a cutaway view of needle bed 1 of said knitting machine, thus corresponds, for its major part, to FIG. 1, and it shall no longer be described in detail. However, it should be noted that the number of tricks 28 in auxiliary bed 27 is equal to the number of tricks 2 of needle bed 1, rather than double that number, as has been described with respect to FIG. 1. In tricks 28 a lower selector (29) slides, held vertically be retaining wires 30 and 31, integral with auxiliary bed 27. An upper selector 32 is also mounted on lower selector 29.

A cam box corresponding to the one shown in FIG. 2 and designated by reference symbol 33 is assigned to each needle bed 1.

Each knitting system is again, when viewed from the cam boxes' direction of travel, preceded by a selection station as shown in FIG. 2 and previously described. Thus, when the cam boxes move in the direction indicated by arrow A (FIG. 2), selection station 48 precedes knitting system 34, while selection station 49 precedes knitting system 35. In case of movement in the opposite direction, selection station 50 precedes knitting system 35, while selection station 49 precedes knitting system 34. Selection station 49 is intended to work together with the two knitting systems 34, 35, depending on the cam boxes' direction of travel.

Figure 10:
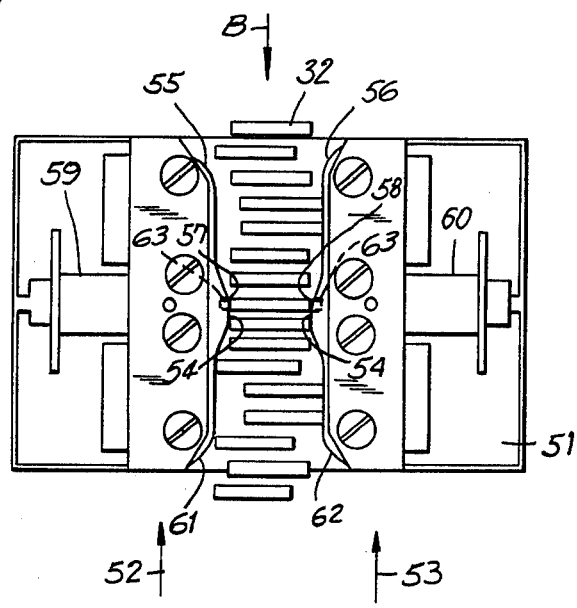
FIG. 10 is a selection station.
Figure 11:
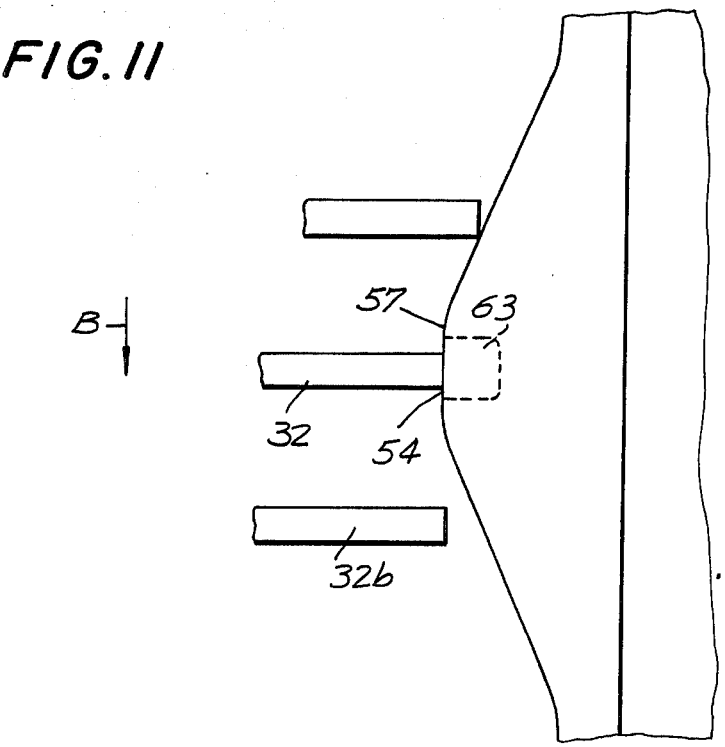
FIG. 11 is a fractional portion of FIG. 10, on a larger scale.

A selection station as shown in FIGS. 10 and 11 comprises a base plate 51 on which there are mounted two identical selection half-stations 52, 53, intended to constitute the selection channel in which selectors 32 defile. This device is designed to operate in either direction. We are considering, within the scope of this example, that selectors 32 are moving, relatively with respect to the device, in the direction indicated by arrow B. The selection channel comprises an entry point which becomes progressively narrower and is limited by flanks 55, 56 and by a selection point defined as being the channel's narrowest place, located between poles 57, 58 of electromagnets 59, 60, and an exit point which becomes progressively wider and is limited by the selection point and by flanks 61, 62. In order to be able to freely select each needle either in stitching-in-action position, or in out-of-action position, or in tuck position, there is effected here a selection of selectors 32 in three different positions. Two of the three positions are obtained when either one of electromagnets 59, 60 is energized and pulls the selector located in the channel's narrowest place against its pole 57, 58, respectively. This selector thereupon follows flank 61, 62, respectively, and is then pulled through magnetic adherence out of the station's longitudinal plane of symmetry. The third distinct position is obtained when none of the electromagnets 59, 60 is energized, so that selectors 32 thus selected remain in a middle position at the center of the selection channel.

Part of upper selectors 32 defiling in the channel's entry point are stuck against either of flanks 55, 56. When leaving said flanks, the magnetic field is interrupted and a remanence stays active in upper selector 32. Said remanence disturbs the correct selection of upper selectors 32 and must, consequently, be reduced. In order to achieve this, a first possibility consists in providing a vertical recess 63 on selection stations 48, 49 and 50 at the center of each pole 57, 58. When a selector 32 is located opposite recess 63, its remanent magnetic circuit is opened and, on account of this, the remanence is reduced to a significant extent. Another advantageous method of significantly reducing the remanence is to induce in each electromagnet 59, 60 a weak magnetic field that is the reverse of that of the fields of flanks 55, 56. A third advantageous method of significantly reducing the remanence is to combine recesses 63 with the reverse, weak magnetic field.

FIG. 11 shows recess 63. Its width must be larger than the thickness of an upper selector 32, and its depth must be sufficient to positively reduce the remanence. The guide strips 54 of hard, non-magnetic metal that are used in this type of selection station obviously are not provided with such recesses.

Upper selector 32 is mounted on lower selector 29 (FIG. 8A). Consequently, the latter must follow the former's movements and it thus slides in either of the three different positions described above. Its end 64 comprises two contact faces 64a, 64b (see FIG. 8B) of different levels as from the bottom of trick 28.

We are describing the "three-track" needle selection principle in connection with FIGS. 8 and 9. The cam boxes move in the direction indicated by arrow A, and selectors 32 are in the "in-action" position. They have been placed in this position by selector station 48 upon the cam boxes' preceding passage in opposite direction. Fixed vertical cam 42a presses against a spring effect of spring 65 and of upper stem 6 of needle 3 on all lower butts 66. On account of this, each two-arm lever 4 rotates about its pin 18, and nose 67 of said two-arm lever is located above end 64 of lower selector 29. Selection station 48 moves upper selectors 32 into the three distinct positions; selectors 32a are in the "out-of-action" position, selectors 32b are in the "in-action" position, and selectors 32c are in the "tuck" position. Once the selection has been made, fixed vertical cam 42a is passed beyond. Under the action of spring 65 and of upper stem 6, two-arm levers 4 tend to return to their position according to FIG. 8.

Lower selectors 29, whose upper selectors 32 are selected in 32a, shall have their ends 64 advanced so that noses 67 will rest against contact faces 64a, thus preventing their two-arm levers 4 from returning. Needle butts 7 of corresponding needles 3 shall remain imbedded in needle bed 1 and shall thus be in position 7a of FIG. 9.

Lower selectors 29, whose upper selectors 32 are selected in 32b, shall have their ends 64 in the middle position so that noses 67 will rest against contact faces 64b. Thus their two-arm levers 4 return to a middle position in which they no longer press against upper stems 6 so that respective needle butts 7 emerge from needle bed 1, at which time they will be taken over by the cams of knitting system 34. See position 7b in FIG. 9. Corresponding needles 3 shall form stitches.

Lower selectors 29, whose upper selectors 32 are selected in 32c, shall have their ends 64 moved back so as to be out of reach of noses 67. Thus, their two-arm levers 4 return to the position shown in FIG. 8B, this resulting from the pressure exerted by spring 65. These two-arm levers 4 no longer press against their needles which are, on account of this, taken over by the knitting device. Butts 25 of corresponding tuck selectors 5 follow cam track 26a (FIG. 9). They undergo an ascension in ascending portion 46a such that their lower butts 66 be pushed in the action path of fixed vertical cam 47a. According to the same principle as the one underlying vertical cam 42a, it presses against lower butts 66. Needle butt 7 of the corresponding needle is momentarily imbedded and assumes position 7c of FIG. 9. Once it has been released by vertical cam 47a, descending portion 46b places tuck selector 5 back into its position shown in FIG. 8B, and needle butt 7 re-enters the cam track and is brought down by stitch cam 37. The needles thus selected will perform a yarn tucking operation. The same process takes place in connection with the next knitting system, in this case, knitting system 35, by means of fixed vertical cam 42b of selection station 49 and of fixed vertical cam 47b.

Upper selectors 32 selected in middle position 32b could, under the effect of an impact or of vibrations, be flung against either of flanks 61, 62 (FIG. 10) of a selection station 48, 49, 50. This, above all, when the machine is stopped or in slow motion. In order to prevent any instability and the resulting knitting mistakes, a light braking action is applied to the selectors. To achieve this, a permanent magnetic field is induced by permanent magnets 68 covered by a pole piece 69. Both are housed in a recess 70 of auxiliary bed 27 and extend over the entire needle field. The pole piece attracts lower selectors 29 by acting on the base of a recess 71 in lower selectors 29, thus increasing the resting force of lower selectors 29 against the bottom of their tricks 28 and thus increasing the friction force at said location.

Another braking means consists in housing a brake spring in a trick, both extending along auxiliary bed 27, and similar to spring 14 in groove 16 of needle bed 1.

Another braking means consists of a shoe-type spring housed at the center and bottom of the selection stations' channel. Said spring extends over the length of the station and presses against the upper side of upper selectors 32. Alternatively, the shoe brake may be housed behind the selection station and act on an extension of the lower selector.

Another braking means consists of one or several permanent magnets covered by a pole piece, they being housed at the bottom and in the center of the selection stations' channel and acting on the upper face of upper selectors 32. The pole piece and the magnets must be attached with a slight amount of clearance so as to enable them to absorb side unevennesses of upper selectors 32. Alternatively, permanent magnets may be housed both below the lower selectors and above the upper selectors.

Still another braking means consists of a strip of soft, elastic material with a good friction coefficient, housed in recess 70 and extending over the entire length of the needle field.

Although illustrative embodiments of the present invention have been described herein with reference to the accompanying drawings, it is to be understood that the invention is not limited to the precise embodiments and that various changes and modifications may be effected therein by one skilled in the art without departing from the scope or spirit of this invention.

What is claimed is:

1. A knitting machine having stitch transfer capability, which comprises:
   at least one needle bed having a groove formed therein;
   a needle at least partially housed in said groove and reciprocatingly slidable therein;
   needle cam means;
   needle cam follower means mounted on said needle and selectively engagable with said needle cam means whereby relative movement between said needle cam means and said needle cam follower means, when the latter is engaged with the former, causes said needle to move relative to said needle bed;
   control means for selecting a needle stitch and including a selection station and at least one selector member slidably mounted on said needle bed, said selector member being responsive to said selection station and positioned thereby in one of at least two distinct positions in respect to said needle bed; and
   needle cam disengaging means responsive to said stitch selecting control means for controllably disengaging said needle cam follower means and including a lever pivotally mounted on said needle bed and having a first arm which cooperates with said selector member and a second arm opposite the first which communicates with said needle cam follower means via said needle and acts operatively thereon to disengage said needle cam follower means from said needle cam means, said lever being responsive to said selector member so as to occupy distinct positions about its pivotal axis which correspond to distinct positions of said selector member; a tuck selector slidably mounted on said lever; tuck selector first cam means; tuck selector cam follower means mounted on said tuck selector which engages said tuck selector first cam means when said lever is in one of said distinct positions whereby relative movement between said tuck selector first cam means and said tuck selector cam follower means, when the latter is engaged with the former, causes said tuck selector to move from a first position to a second position in respect to said lever; and tuck selector second cam means positioned to engage said tuck selector when said tuck selector is in said second position which, when engaged with said tuck selector, causes the second arm of said lever via said tuck selector to disengage said needle cam follower.

2. A knitting machine as defined in claim 1 wherein said selector member has at least a portion thereof formed of magnetically conductive material and wherein said selection station includes a controllably energizable electromagnet to effect the positioning of said selector member.

3. A knitting machine as defined in claim 2 wherein a pair of selector members are slidably mounted in juxtaposition on said needle bed, each of said selector members being responsive to said selection station and positioned thereby in one of at least two distinct positions, each of said selector members having a lower portion which slides in a respective groove formed in said needle bed and an upper portion which is mounted on said lower portion, at least said upper portion being formed of a magnetically conductive material so as to be responsive to a magnetic field produced by said electromagnetic selection station.

4. A knitting machine as defined in claim 1 further comprising means for stabilizing said selector member, said stabilizing means including a source of magnetic flux and pole means formed of magnetically conductive material and coupled to said magnetic flux source, said pole means being positioned in close proximity to said selector member to hold said selector member by magnetic attraction in a position in which it is placed by said selection station.

5. A knitting machine as defined in claim 1 wherein said tuck selector cam follower means is a butt projecting from the upper surface of said tuck selector and wherein said tuck selector first cam means is positioned above said tuck selector and has formed in the lower surface thereof a cam track to receive said tuck selector butt.

6. A knitting machine as defined in claim 3 wherein a portion of said needle bed which borders said grooves in which said selector members are mounted is formed of a non-magnetic material.

7. A knitting machine as defined in claim 3 wherein said lower portions of said selector members are fitted with contact faces of different heights relative to each other in respect to said needle bed, each of said contact faces engaging said first arm of said lever when its respective selector member is positioned by said selection station to effect engagement.

8. A knitting machine as defined in claim 2 wherein said electromagnet includes a pole piece having a vertical recess formed centrally on a surface thereof which is proximate to said selector member to prevent the occurrence of a magnetic field remenance in said selector member.

9. A knitting machine as defined in claim 8 wherein the width of said vertical recess is greater than the width of the upper portion of said selector member.

10. A knitting machine as defined in claim 4 wherein said magnetic flux source of said stabilizing means is a permanent magnet which is housed in a groove formed in a portion of said needle bed below said selector member, said groove extending substantially perpendicular to the direction of travel of said selector member.

11. A knitting machine as defined in claim 4 wherein said magnetic flux source of said stabilizing means is a permanent magnet and wherein said selection station has a base plate in which is housed said permanent magnet, said permanent magnet acting upon the upper portion of said selector member to hold said selector member in a position in which it is placed by said selection station.

12. A knitting machine as defined in claim 1 which further comprises means for stabilizing said selector member, said stabilizing means including a pair of permanent magnets which are positioned above and below said selector member in close proximity thereto to hold said selector member by magnetic attraction in a position in which it is placed by said selection station.

13. A knitting machine as defined in claim 1 further comprising means for stabilizing said selector member, said stabilizing means including brake shoe means acting operatively on said selector member as a brake to hold said selector member in a position in which it is placed by said selection station.

14. A knitting machine as defined in claim 13 wherein said selection station further comprises a base plate which houses said brake shoe means, said brake shoe means contacting with braking pressure the upper face of said upper portion of said selector member.

15. A knitting machine as defined in claim 13 wherein said selector member includes an extension and wherein said brake shoe means is housed behind said selection station and acts operatively on the extension of said selector member.

16. A knitting machine as defined in claim 1 further comprising means for stabilizing said selector member, said stabilizing means including a strip of elastic material which is housed in a groove formed in a portion of said needle bed below said selector member, said groove extending substantially perpendicular to the direction of travel of said selector member, said elastic strip contacting said selector member with sufficient frictional resistance to hold said selector member in a position in which it is placed by said selection station.

17. A knitting machine as defined in claim 1 further comprising means for stabilizing said selector member, said stabilizing means including a brake spring which is housed in a groove formed in a portion of said needle bed below said selector member, said groove extending substantially perpendicular to the direction of travel of said selector member, said brake spring applying a sufficient braking force to said selector member to hold said selector member in a position in which it is placed by said selection station.

* * * * *